United States Patent [19]
Flory et al.

[11] 4,351,351
[45] Sep. 28, 1982

[54] BREAKAWAY PIPE COUPLING WITH AUTOMATICALLY CLOSED VALVES

[75] Inventors: John F. Flory, Morris Township, Morris County; Steven P. Woehleke, Convent Station, both of N.J.

[73] Assignee: Exxon Research and Engineering Co., Florham Park, N.J.

[21] Appl. No.: 175,946

[22] Filed: Aug. 7, 1980

[51] Int. Cl.³ ............................................. F16K 13/04
[52] U.S. Cl. ............................. 137/68 R; 137/614.03; 285/2; 251/149.7
[58] Field of Search .......... 137/60 R, 614.03, 614.02; 251/149.7; 285/2, 3; 220/89 A

[56] References Cited

U.S. PATENT DOCUMENTS

| 3,319,642 | 5/1967 | Fox | 137/68 R |
| 3,489,160 | 1/1970 | Moore | 137/68 R X |
| 4,023,584 | 5/1977 | Rogers | 137/68 R |
| 4,127,142 | 11/1978 | Snider | 137/68 |
| 4,181,149 | 1/1980 | Cox | 137/614.03 X |
| 4,307,744 | 12/1981 | Marrison | 137/68 R |

Primary Examiner—Harold W. Weakley
Attorney, Agent, or Firm—Donald F. Wohlers

[57] ABSTRACT

A breakaway pipe coupling comprising first and second telescoping pipe sections that are joined together by a load control mechanism designed to release in a controlled manner at a predetermined axial load.

The load control mechanism, which may assume the form of a cutter ring carried by one pipe section and which bears against the exterior of the other section, or may be a plurality of external cylinders housing cutter rings attached to one pipe section which bear against rods passing through the cylinders and attached to the other pipe section. Such a load control mechanism holds the pipe sections together up to a certain predetermined tension load.

A valve is disposed within the first pipe section and is joined by a crank and a rod to a second pipe section so that when the pipe sections are joined together, the valve is retained in an open position and fluid can freely flow through the coupling. When the pipe sections separate, the valve is closed to prevent fluid flow.

When the coupling is subjected to a tensile force exceeding the predetermined tension load, the load control mechanism yields in a controlled manner by the action of the cutting ring(s) shearing material from the surface on which it bears. The sections separate at a rate proportional to the rate at which tension is applied. As the sections separate, the valve closes so that the contents of the pipeline are not discharged into the environment.

12 Claims, 10 Drawing Figures

BREAKAWAY PIPE COUPLING WITH AUTOMATICALLY CLOSED VALVES

BACKGROUND OF THE INVENTION

1. Field of the Invention

This invention relates generally to breakaway pipe couplings for insertion in a marine hose or pipeline. More particularly, this invention relates to breakaway pipe couplings designed to separate in a controlled manner under tensile loads exceeding a predetermined limit so that the hose or pipeline into which the coupling is connected will be protected against permanent structural damage.

2. Description of Relevant Art

Breakaway pipe couplings for use in pipelines for transmitting oil and other liquid fuels or fluids are known; one commercially available breakaway pipe coupling is described in U.S. Pat. No. 4,059,288, granted Nov. 22, 1977, to Harvey O. Mohr. Another commercially available breakaway pipe coupling is described in European Patent Application Publication No. 6278A1, by Gall Thompson published Jan. 9, 1980.

The Mohr patent discloses a separable safety pipeline connector which will yield at a predetermined tension. The connector of this device includes a housing having one axial end adapted for connection to the pipeline, with the other axial end open. The connector includes a pipe extension member having one axial end adapted for connection to the pipeline for transmission of line fluids therethrough, and the other axial end arranged to telescopically fit in the connector housing in a sealed relationship. A shear disc is mounted between the housing and extension member for restraining the same against axial separation in response to axial tension forces applied thereto. The shear disc ruptures at a predetermined level, so that axial separation is prevented below such level and axial separation is permitted above such level.

The pressure balanced, breakaway pipe coupling disclosed by both the aforementioned Mohr patent and Thompson application, while recognizing a definite need in liquid fuel pipeline technology, suffer several structural and functional shortcomings. For example, both couplings allow instantaneous separation without regard for the rate or magnitude of the applied load. Thus, even a momentary tension overload will cause complete separation of the pipeline and massive spillage of the fluid within the pipeline. In addition, in the Mohr coupling, no means are provided for terminating the fluid flow through the coupling by sealing the ends of the pipe segments. Thus, the contents of the pipeline can be discharged into the environment. Furthermore, this coupling design is expensive to manufacture and install.

Additional relevant U.S. art includes U.S. Pat. Nos. 427,305; 893,911; 1,162,117; 1,526,218; 2,300,483; 2,948,553; 2,991,090; 3,520,331; and 3,921,656.

SUMMARY OF THE INVENTION

With the above deficiencies clearly in mind, the present invention contemplates a load control mechanism for a breakaway pipe coupling which separates in a controlled manner at a rate proportional to the rate and magnitude of the applied tension.

The instant breakaway coupling utilizes one or a pair of valves disposed within the coupling which close at a rate proportional to the rate of separation to terminate fluid flow. Thus, the risk of pollution and the risk of high surge pressures are avoided.

The valve or valves in the instant coupling may be either ball valves or butterfly valves. In either instance, rods or linkages are arranged between the first and second pipe coupling sections for retaining the valves in the open position while the pipe sections are retained together by the load control mechanism. The rods or linkages disengage when the pipe sections separate, and springs close the valves. Closure of the valves is proportional to the rate at which the coupling sections separate. Thus, the risk of back pressures in the fluid of the pipeline is minimized and leakage is prevented.

The present coupling designs of this invention are easy to manufacture and install, thus eliminating one of the major drawbacks with the previous design.

Numerous other advantages of the instant breakaway pipe coupling will become apparent from the attached drawings when construed in harmony with the ensuing specification.

It is an object of the present invention to provide an improved pipeline coupling device for installation in fluid carrying pipelines;

it is another object of this invention to provide a pipeline coupling device which will release in a controlled manner;

it is a further object of the invention to provide a pipeline coupling device which will avoid polluting the environment and which will avoid high surge pressures upon release.

These and other objects of this invention will become more apparent and will be better understood with reference to the following detailed description considered in conjunction with the accompanying drawings.

DESCRIPTION OF THE PREFERRED EMBODIMENT

Figure 1:
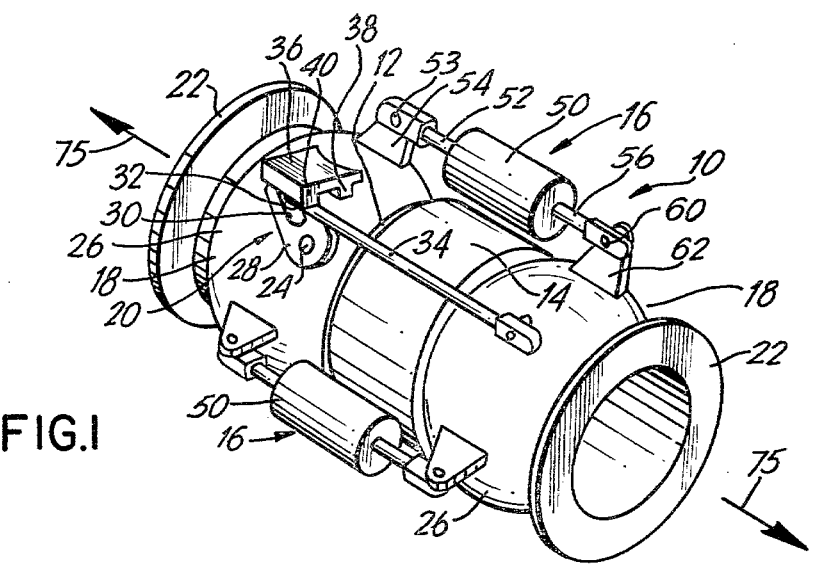
FIG. 1 is a perspective view of a breakaway pipe coupling constructed in accordance with the principles of this invention, the coupling shown installed in a pipeline.

Both embodiments of the instant breakaway pipe coupling can be used in diverse marine terminal applications. For example, referring to FIG. 7, the breakaway pipe coupling devices 10, shown in schematic only, could be interposed between sections of floating hose 101 attached to a buoy 102 in a catenary anchor leg mooring (CALM), or could be positioned between sections of underwater hose 103 connecting the buoy 102 with an underwater pipeline manifold 104. The breakaway pipe coupling could also be utilized between the underwater pipeline manifold 104 and the pipeline 105 or at any point in the pipeline. Alternatively, the coupling could be positioned between a hose string and the pipeline manifold at a multiple buoy mooring. At a pier, the coupling could be utilized effectively in loading arms, or between hoses and piping on the pier. Several other marine terminal applications and many other pipeline and hose system applications are also envisioned.

Figure 2:
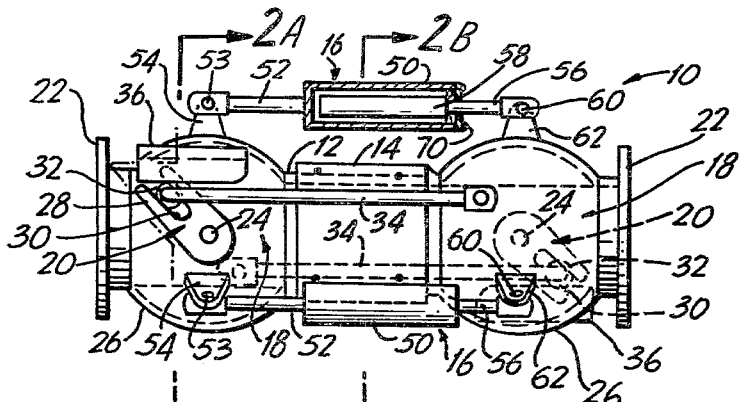
FIG. 2 is a plan view through the pipe coupling of FIG. 1, such view showing the load control mechanism holding the pipe sections of the coupling in fixed position with the valves gated in open position.
Figure 3:
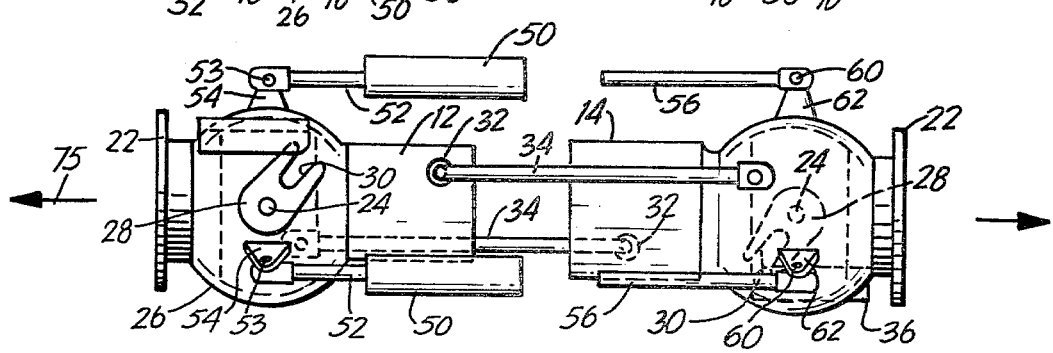
FIG. 3 is a plan view similar to FIG. 2, but showing the load control mechanism after yielding so that the pipe sections are separated and the valves are closed.

Referring to FIGS. 1 through 3, perspective, sectional, and plan views of the pipeline coupling device 10 of this invention are shown.

Figure 7:
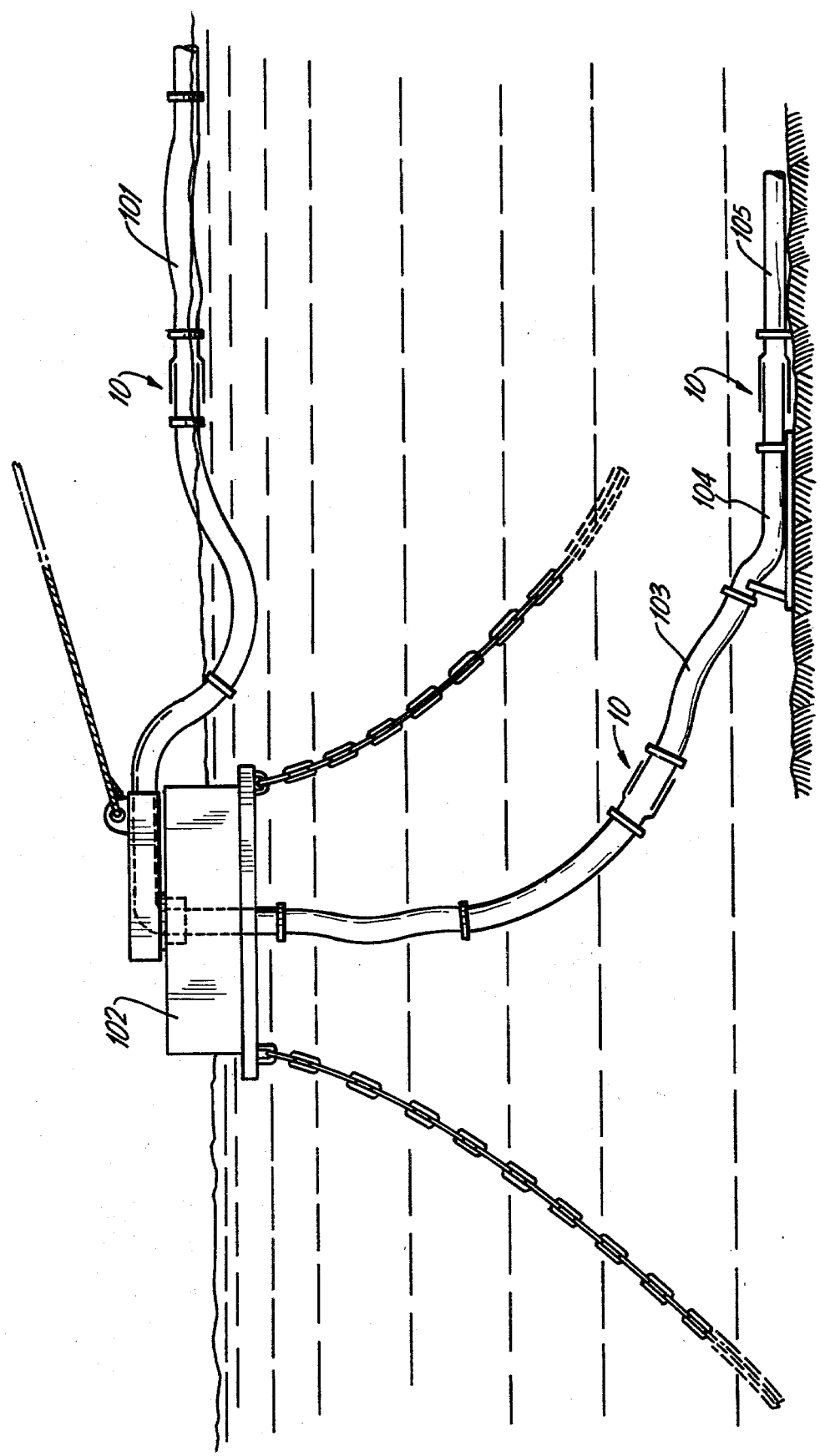
FIG. 7 is an in situ view of the coupling devices of this invention, as they might find use in pipeline systems at a typical application, an offshore mooring for tankers.

The coupling device 10 is designed to be disposed in a pipeline as schematically shown in FIG. 7, and comprises a first coupling cylindrical section 12, which is coaxially fitted (telescoped) within a second coupling cylindrical section 14. These coupling sections form a seal with each other, such that fluid will pass across the coupling and through said pipeline.

The coupling device 10 is fitted to the pipelines of FIG. 7 by bolting the end flanges 22 to the corresponding flange sections (not shown) in the pipeline.

The coupling sections 12 and 14 are secured together by a plurality of load control links 16, which structurally bridge the coupling sections and which will be described in more detail hereinafter. Each coupling section has an internal ball valve 18 which is fitted with a valve operating mechanism 20, designed to terminate fluid flow to each coupling section 12 and 14, respectively, by closing the ball valve 18 upon separation of the coupling sections.

The ball valves 18 are normally open when the coupling sections 12 and 14 are fitted together as shown in FIGS. 1 and 2.

Figure 2A:
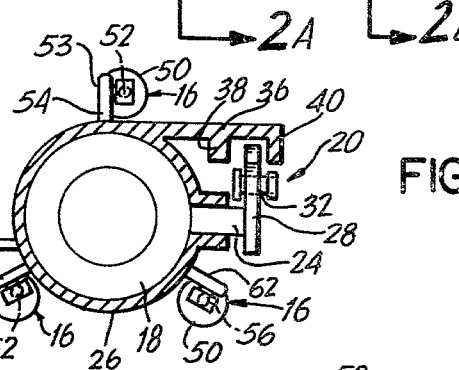
FIGS. 2A and 2B illustrate sectional views of the invention taken along lines 2A and 2B, respectively of FIG. 2.
Figure 2B:
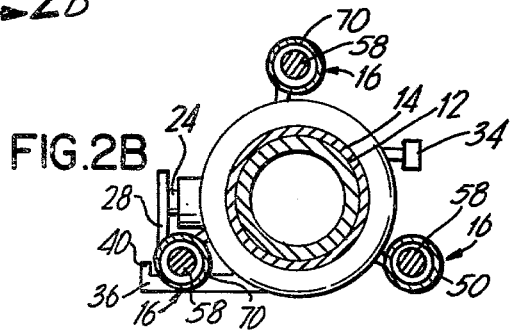

A shaft 24 is connected to each ball valve 18, and extends through ball valve housing 26, as more clearly shown in FIG. 2A. Each shaft 24 is fixedly secured to a crank 28 having a U-shaped radial slot 30. The U-shaped slot 30 of the crank 28 carries a headed cam stud 32, which rides within the U-shaped cam surface 30. A push rod 34 fixedly connects on one end with said cam stud 32 and fixedly connects on the other end to the ball valve housing 26 of the other coupling section.

A plate 36 is welded to the ball valve housing 26. The flange 36 has two flanges 38 and 40, respectively, which act as radial guides for the rotational movement of the crank 28. These flanges 38 and 40 also prevent the cam stud 32 from leaving the slot 30 until the valve crank 28 has moved to the closed position.

The load control links 16 each comprise a cylindrical housing 50 which is connected to one of the ball valve housings 26 through a rod 52 protruding from each housing 50 and pinned by pin 53 to each trunnion 54 mounted on the housing 26. A shaft 56 extends into the open end of each cylinder 50. Each shaft 56 terminates in an enlarged shaft end 58 enclosed within each cylinder 50 (FIG. 2). The other end of each shaft 56 is connected to the opposite ball valve housing 26 through similar pin 60 and trunnion 62 arrangement. An annular cutting collar 70 is fastened to the open end of each cylinder 50 and rides upon each shaft 56, within each cylinder 50. The cutting collar 70 will cut material from the enlarged shaft end 58 when a sustained tension exceeding a predetermined value is applied to each of the rods 52 and 56, thus pulling shaft 56 through the cutting collar 70 and out of the cylinder 50.

OPERATION OF THE FIRST EMBODIMENT OF THE INVENTION

When a sustained predetermined tension is applied upon the pipeline coupling 10, as shown by arrows 75, as when mooring forces are applied to the floating hose 101 (FIG. 7), the load control links 16 begin to separate. The sealed coupling sections 12 and 14 begin to separate, but nevertheless, maintain their fluid seal until they completely come apart as shown in FIG. 3.

The load control links 16 will not separate until a given energy is dissipated by the cutting of material, i.e., until all the material in the enlarged shaft end 58 is cut from each of the shafts 56 by the cutting collar 70.

A dynamic or shock loading may cause the cutting collar 70 to begin cutting cylinder 58, but only a sustained tension loading exceeding a given magnitude will free shafts 56 from cylinders 50.

As the load links 16 begin to separate under tension, rods 34 will begin to turn the cranks 28 via cam studs 32. Thus, the ball valves 18 will gradually start limiting the fluid flow through coupling 10, as they are rotated towards their closed position by cranks 28.

When a sufficient force or energy is dissipated, the coupling will finally come apart as shown in FIG. 3. The ball valves 18 will be completely shut to prevent leakage from either of coupling sections 12 and 14, respectively.

The load links 16 will be designed to begin separating at a force level below that which would cause damage to the pipeline. Thus the coupling 10 is the "weak link" in the pipeline.

The separation of the coupling sections and the closure of the ball valves proceeds at a rate which is proportional to the magnitude of the applied force. Thus the rate of closure is no greater than that necessary to prevent failure of the pipeline and sudden surge pressures in the fluid flowing through the pipeline are avoided.

DISCUSSION OF THE SECOND EMBODIMENT

Figure 4:
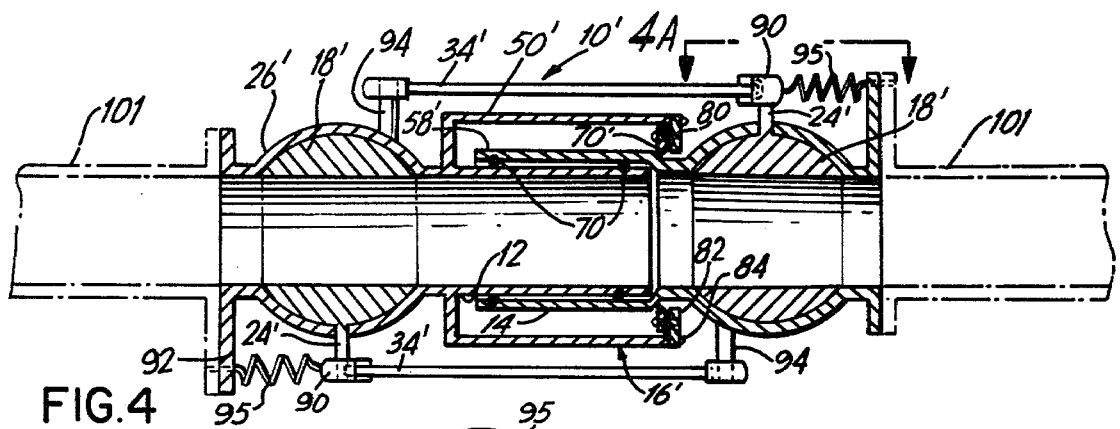
FIG. 4 is a cross-sectional view through an alternative embodiment of a pipe coupling device, such view showing the pipe sections held together by a unitary load control mechanism.
Figure 5:
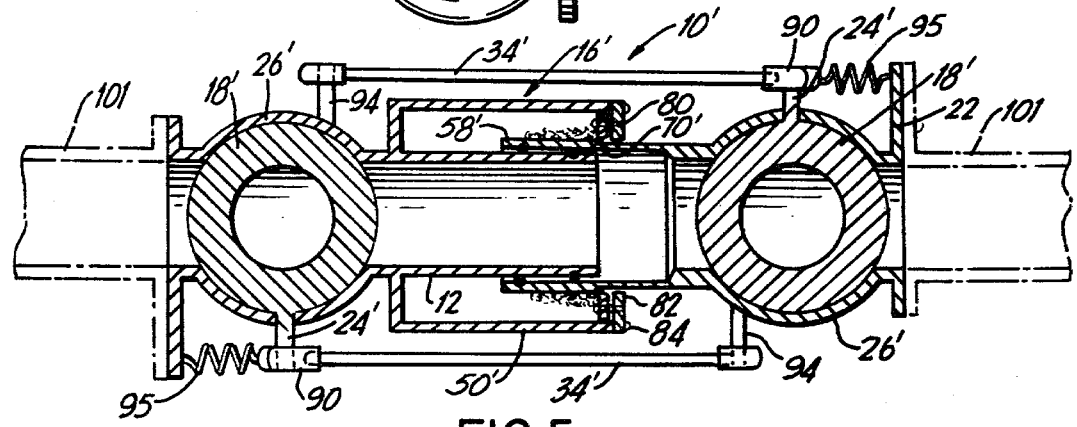
FIG. 5 is a view similar to FIG. 4, but showing the pipe sections as they move relative to one another.
Figure 6:
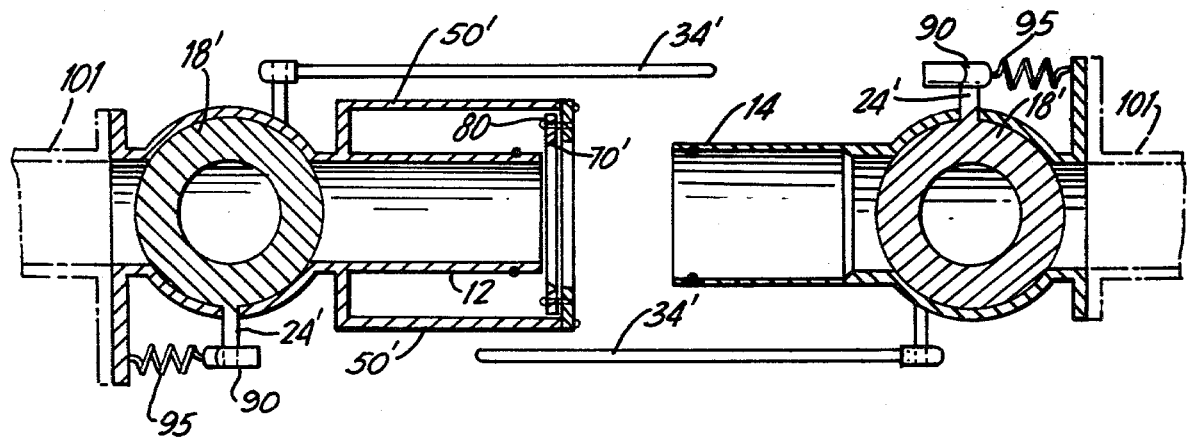
FIG. 6 is a view similar to FIG. 5, but showing the pipe sections completely separated from one another.

FIGS. 4 through 6 illustrate a second embodiment of the invention, wherein like elements will bear the same designations for the sake of brevity.

A pipeline 101 has a coupling 10' connected therein. Coupling sections 12 and 14 are coaxially held together in a fluid sealing relationship by a load control mechanism 16', which comprises a concentrically disposed cylinder 50' attached to coupling section 12. Seal rings 70 prevent fluid from leaking between coupling sections 12 and 14.

Coupling section 14 has raised cuttable material 58' about its cylindrical periphery.

An annular cutting collar 70' laterally slides upon coupling section 14, and cuts away material 58' (see FIG. 5) as the coupling sections 12 and 14 separate. The cutting collar 70' is fixed to annular flange 82 by pin 80.

Flange 84 is fastened over the open end of cylinder 50' by bolts 84.

Figure 4A:
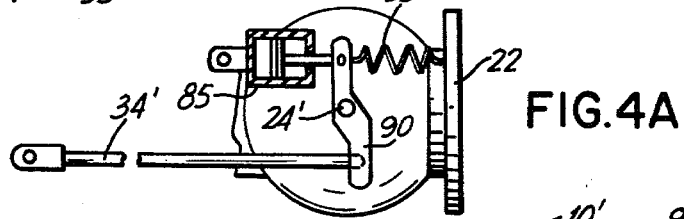
FIG. 4A is a plan view of a portion of the device shown in FIG. 4, showing the valve operating means in detail as viewed along lines 4A.

Each section 12 and 14, respectively, has a ball valve 18' which is retained in the open position when the coupling sections are held together. The valve 18' is retained closed by means of the crank 90 and spring 95 connected between the crank 90 and flange 22. A dashpot 85 connected to the crank 90 and anchored to the housing 26' regulates the motion of the crank 90, as shown in FIG. 4A.

DISCUSSION OF THE OPERATION OF THE SECOND EMBODIMENT OF THE INVENTION

An alternate mechanism for closing the ball valves 18' as coupling sections 12 and 14 separate is provided in the second embodiment. The shafts 24' connect to each ball valve 18' through housing 26'. Cranks 90 are connected to each ball valve by shafts 24'.

Spring 95, connected between one end of each crank to a fixed post 92, extending from valve housing 26 urge each valve to the closed position.

Rods 34' are pivotally connected by pins 94 to an opposite housing 26' at one end, and fit into slots or holes 96 in the arm of crank 90 opposite the spring 95'.

Rods 34' hold each crank 90 against spring-urged rotation. As the coupling sections 12 and 14 begin to separate, the rods 34' become free and the cranks 90 are each allowed to rotate to close ball valves 18'. In the open position, shown in FIG. 6, ball valves 18' are completely closed by the rotation of cranks 90, and rods 34' have separated from their engagement with cranks 90. A dashpot 85 illustrated in FIG. 4A can be attached to an arm of each crank 90 in order to prevent the sudden closure of each ball valve 18'.

The cutting collar 70' and the raised cuttable material 58' are sized and designed to begin cutting at a predetermined load. When a higher tension load is applied across the coupling, the cutting collar 70' begins cutting away the material 58' from about coupling section 14.

With respect to a further teaching of the operation of the cutting collars 70 and 70' as set forth in the first and second embodiments, respectively, reference may be had to copending U.S. application Ser. No. 152,854, the reference of which is meant to incorporate these teachings.

Having described the invention, it can be observed that the objects set forth earlier have been satisfied.

Therefore, what is desired to be protected by Letters Patent is presented by the following appended claims.

What is claimed is:

1. A breakaway pipe coupling comprising:
   (a) first and second pipe sections, said first pipe section coaxially joining with said second pipe section in a sealed relationship;
   (b) valve means situated within at least one of said pipe sections for regulating fluid flow therethrough;
   (c) retaining means associated with said valve means for holding said valve means in an opened position when said first and second sections are joined together; and
   (d) load control means extending between said first and second pipe sections for securing said sections together, said load control means including a cylindrical housing secured to one of said pipe sections and extending axially over the other of said pipe sections, a radially extending cutting collar formed at one end of said cylindrical housing, said cutting collar engaging an exterior portion of the other of said pipe sections and cutting thereinto when said pipe sections separate, said load control means adapted to yield in response to a sustained tensile load exceeding a predetermined limit, thereby allowing said pipe sections to separate at a rate dependent on the magnitude and rate of said tensile loading and whereby said retaining means are disengaged and said valve means are permitted to shut, thereby terminating flow through said pipe sections at a rate proportional to the rate at which said sections separate.

2. A breakaway coupling as defined in claim 1, wherein said first pipe section terminates in an enlarged cylindrical sleeve that fits over said second pipe section in telescoping fashion.

3. A breakaway pipe coupling as defined in claim 1, wherein sealing means are positioned between joining portions of said first and second sections.

4. A breakaway pipe coupling as defined in claim 2, wherein a shoulder is formed on an interior portion of one section so that the other section can abut thereagainst when the sections are joined together in telescoping fashion.

5. A breakaway pipe coupling as defined in claim 1, wherein said valve means comprises a ball valve seated within said first pipe section, and said retaining means includes closing means comprising a linkage arm and a crank arm connected to said ball valve, and fastened to said second pipe section.

6. A breakaway pipe coupling as defined in claim 1, wherein said retaining means includes means for urging said valve means toward a closed position and comprises a crank secured to said valve means, and spring means secured to an exterior portion of said pipe sections for exerting a biasing force upon said crank.

7. A breakaway pipe coupling as defined in claim 2, wherein a shoulder is formed on an interior portion of said first pipe section, one end of said second pipe section abutting against said shoulder when said pipe sections are joined together in telescoping fashion.

8. A breakaway pipe coupling as defined in claim 1, further comprising hydraulic dampers for regulating the rate of closing of said valve means when said load control mechanism has yielded, and said retaining means has been disengaged.

9. A breakaway pipeline coupling device disposed in a portion of a fluid pipeline for disengaging said pipeline when a predetermined tensile loading is applied along said fluid pipeline, said coupling device comprising:
   a first coupling section;
   a second coupling section forming a fluid seal with said first coupling section; and
   a load control device comprising a jacket affixed to said first coupling section circumferentially disposed about said second coupling section for securing said first coupling section to said second coupling section, said jacket including cutting means engaging deformable material on said second coupling section which dissipates tensile energy as a tensile load is applied along said pipeline, said jacket maintaining said fluid seal between said coupling sections until a predetermined tensile loading has been applied.

10. The breakaway pipeline coupling device of claim 9 further comprising a valve means disposed adjacent to at least one said coupling sections for terminating fluid flow through said fluid pipeline when said fluid seal is broken.

11. The breakaway pipeline coupling device of claim 10, wherein said valve means includes a second valve adjacent to the other coupling section and a crank and rod arrangement connected across said coupling sections for closing each valve as said sections disengage.

12. A breakaway coupler comprising:
 (a) first and second coupling sections, normally joined together such that fluid can flow through said coupling sections, and
 (b) load control means extending between said first and second pipe sections for securing said sections together, said load control means including a cylindrical housing secured to one of said pipe sections and extending axially over the other of said pipe sections, a radially extending cutting collar formed at one end of said cylindrical housing, said cutting collar engaging an exterior portion of the other of said pipe sections and cutting thereinto when said pipe sections separate, said load control means adapted to yield in response to a sustained tensile load exceeding a predetermined limit, thus allowing said pipe sections to separate at a rate dependent on the magnitude and rate of said tensile loading.

* * * * *